Patented Oct. 15, 1935

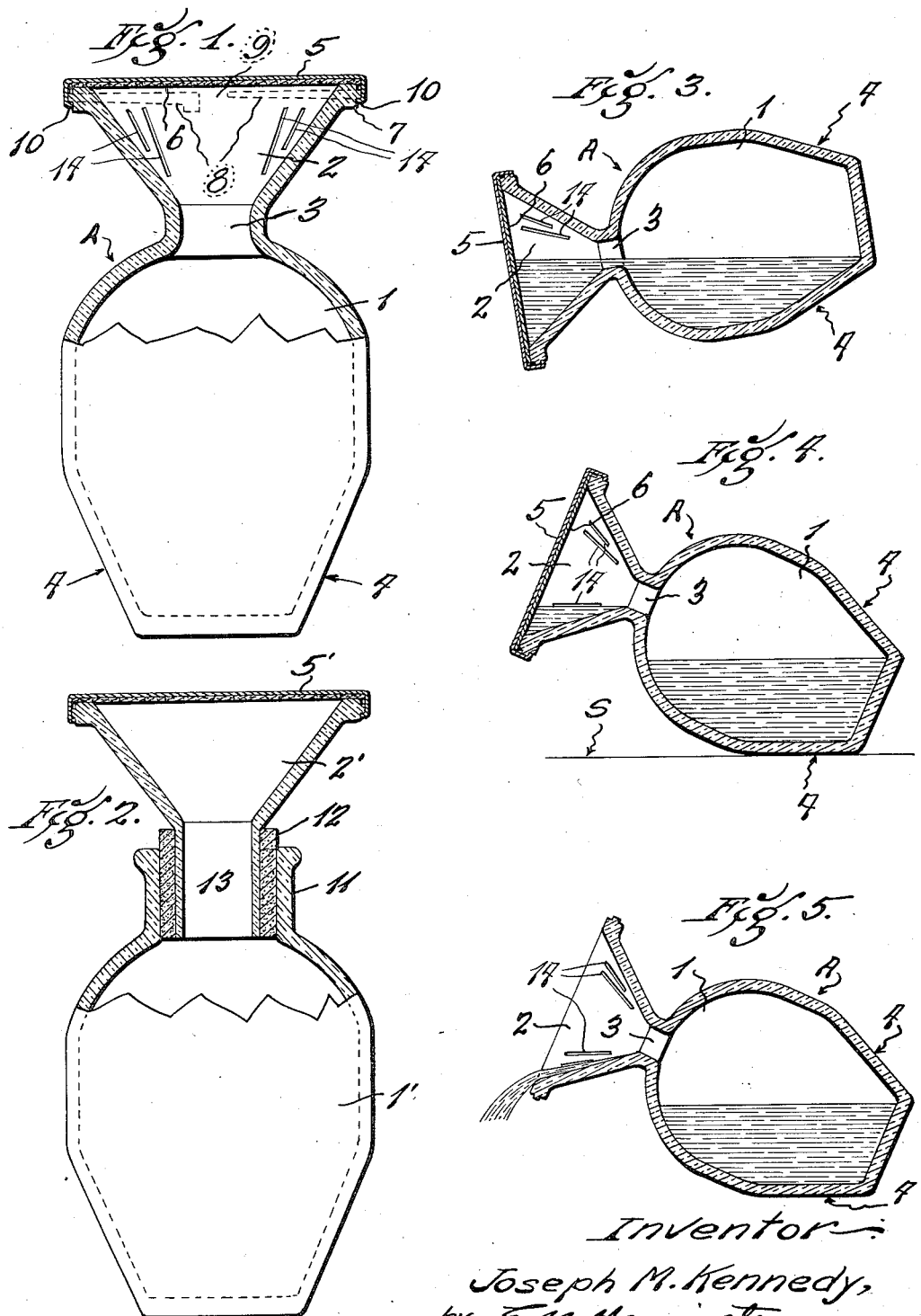

2,017,209

UNITED STATES PATENT OFFICE 2,017,209

BOTTLE AND THE LIKE

Joseph M. Kennedy, St. Louis, Mo.

Application January 31, 1935, Serial No. 4,235

6 Claims. (Cl. 221—147)

This invention relates generally to bottles and the like, and more specifically to an improved bottle, or like element, provided with means for measuring predetermined amounts of liquid therefrom, the predominant object of the invention being to provide a bottle or the like which is so constructed and is capable of such use that it is not necessary for the user of the bottle to be provided with a spoon, or other measuring device, for the purpose of withdrawing predetermined measured amounts of liquid from the bottle.

As is quite generally known, medicines, extracts, and other liquids which are marketed in bottles and like elements frequently are consumed by withdrawing measured amounts of the liquid from the bottles, these amounts usually being teaspoonfuls of the liquid. It frequently happens that the user of such a bottle is not provided with a spoon, or that the use of a spoon would be inconvenient, and I have therefore devised the bottle disclosed herein, which is so constructed that no spoon is necessary to withdraw accurately measured individual teaspoonfuls of liquid from the bottle. The improved bottle disclosed herein includes a main body portion having a measuring well arranged in communication therewith. In use the bottle is tipped so as to cause the measuring well to receive liquid from the body portion of the bottle, after which the bottle is arranged in a predetermined position to permit all but the amount of liquid which it is desired to withdraw from the bottle to drain back into the body portion of the bottle from the measuring well. A removable closure associated with the measuring well may then be removed to permit the measured amount of liquid within the measuring well to be withdrawn therefrom.

Fig. 1 is a view of the improved bottle, showing same partly in elevation and partly in vertical section.

Fig. 2 is a modified form of the invention as illustrated in Fig. 1.

Figs. 3, 4, and 5 illustrate the different positions which the bottle shown in Fig. 1 assumes when a measured amount of liquid is being withdrawn therefrom.

In the drawing, wherein are shown for the purpose of illustration, merely, two embodiments of the invention, A designates in Figs. 1, 3, 4, and 5 the improved bottle generally. The bottle A includes a main body portion 1 and a measuring well or compartment 2, the interior of said main body portion and the measuring well being arranged in communication with each other through the instrumentality of a suitable passageway 3. The main body portion 1 may be of any suitable shape, but a highly essential feature of the invention is that said body portion be provided with one or more inclined faces 4, which are intended for a purpose to be hereinafter set forth. In the drawing I illustrate the bottle as being provided with a pair of the inclined faces 4 located at opposite sides of the body portion 1 thereof, but the precise number and exact locations of the inclined faces are not important, in so far as this application is concerned, it being understood that one or more of the inclined faces may be employed and that the inclined face or faces may be disposed in any suitable positions where they will properly perform their intended function.

While the measuring well or compartment 2 may be of various shapes, the particular measuring well illustrated in the drawing is round in horizontal section and is of tapered formation, with the larger diameter at the outer discharge end of said measuring well. The tapering wall of the measuring well is substantially straight from the inner end of the well to the outer end thereof, although the wall referred to may be curved more or less if this arrangement should be desired. At its outer discharge end the measuring well 2 is closed by a closure element 5, said closure element being provided with a liner 6 which acts as a gasket and serves to provide a fluid-tight joint between the closure element 5 and the outer edge of the measuring well 2.

The closure element 5 is removably attached to the outer discharge end of the measuring well 2, and in order to provide for quick attachment or detachment of said closure element I provide the outer face of the measuring well with an annular flange 7 on which is formed a pair of outwardly extended, circumferential elements 8 which are provided with inclined lower faces. At diametrically opposed points the elements 8 are spaced apart to provide spaces 9 through which inwardly extended portions 10 of the closure element may pass. In applying the closure element 5 to the outer discharge end of the measuring well 2, said closure element is arranged with the inwardly extended portions 10 of the closure element alined with the above the spaces 9. The closure element is then moved downwardly to cause the inwardly extended portions 10 of the closure element to pass through the spaces 9, after which the closure is rotated slightly so as to cause the inwardly extended portions 10 to move into moving contact with the inclined lower faces of the elements 8, whereby the closure element is drawn into close contact with the outer edge of the measuring well and is locked in place. To remove the closure element 5 the operation just described is reversed, the closure element being rotated until the inwardly extended portions 10 of the closure element are alined with the spaces 9, when said closure element may be raised from the measuring well by passing said inwardly extended portions through the spaces 9.

While for the purpose of a complete disclosure I have shown in the drawing and described above a particular manner of removably attaching the closure element 5 to the outer discharge end of the measuring well, I do not wish to be limited to this type of means, as various other closure fasteners may be employed in carrying out my invention.

When in the use of the improved bottle disclosed herein it is desired to withdraw a measured amount of liquid therefrom, the bottle is moved to the approximate position illustrated in Fig. 3, whereupon an amount of the liquid contents of the body portion 1 of the bottle will flow into the measuring well 2 thereof. The bottle is then arranged, as shown in Fig. 4, with one of its inclined faces 4 in contact with a table or other flat support S. This will cause the bottle to be in such position that an amount of liquid equal to a teaspoonful will be trapped within the measuring well, the amount of liquid within the measuring well in excess of the desired amount flowing back from the measuring well into the body portion of the bottle through the passageway 2. The bottle may then be lifted to the place of discharge of the measured liquid, while being maintained in the position shown in Fig. 4 when the closure element 5 is removed and the measured liquid is discharged from the measuring well.

By providing the bottle with inclined faces at opposite sides thereof the bottle may be inclined in one or the opposite direction. Also, by changing the inclinations of the faces 4, more or less liquid may be trapped in the measuring well, or by providing several differently inclined faces at the same side of the bottle or differently inclined faces at opposite sides of the bottle, different amounts of liquid may be trapped within the measuring well.

In Fig. 2 I illustrate a different form of the invention, wherein the measuring well is a separate unit from the bottle proper. In this form of the invention 1' designates a bottle having a neck portion 11. The neck portion 11 of the bottle 1' receives a stopper 12 formed of cork or other suitable material, and this stopper is provided with an opening formed therethrough which receives the lower, tubular portion 13 of a measuring well 2'. The measuring well 2' of Fig. 2 resembles the measuring well 2 of the structure illustrated in Fig. 1, and it is provided with a closure element 5' at its outer discharge end of the type already described herein. The operation of the structure shown in Fig. 2 is the same as operation of the structure shown in Figs. 1, 3, 4, and 5, previously described herein.

In order that a user may be sure that he is measuring the desired amount, I may provide the measuring well 2 of the improved bottle or the like with indicating lines 14. These lines may be formed in the glass of the wall of the measuring well in any suitable manner, or otherwise applied thereto. Any number of these lines may be provided, but in the drawing I show the measuring well with lines which indicate the liquid levels of one teaspoonful, and one-half teaspoonful, of liquid.

I claim:

1. A bottle or the like having a body portion, a measuring well of substantially conical shape located outside of said body portion and arranged in communication with the interior thereof, and a closure element removably attached to said measuring well at the outer discharge end thereof, said bottle being adapted to be tipped to cause liquid to flow from said body portion into said measuring well to trap a measured amount of liquid therein, and said measuring well being so shaped that when the bottle is placed in a predetermined position all liquid within the measuring well in excess of the amount of liquid it is desired to measure therein will flow from the measuring well back into the body portion of the bottle, and that when said closure element is removed the trapped liquid will be discharged from the measuring well without additional tipping of the bottle.

2. A bottle or the like having a body portion, a measuring well associated with said body portion and arranged in communication with the interior thereof, a closure element removably attached to said measuring well at the outer discharge end thereof, said bottle being adapted to be tipped to cause liquid to flow from said body portion into said measuring well to trap a measured amount of liquid therein, and said measuring well being so shaped that when the bottle is placed in a predetermined position all liquid within the measuring well in excess of the amount of liquid it is desired to measure therein will flow from the measuring well back into the body portion of the bottle, and that when said closure element is removed the trapped liquid will be discharged from the measuring well without additional tipping of the bottle, and means for determining the tipped position of the bottle when liquid is trapped in the measuring well and said trapped liquid is discharged from said measuring well.

3. A bottle or the like having a body portion, a measuring well associated with said body portion and arranged in communication with the interior thereof, a closure element removably attached to said measuring well at the outer discharge end thereof, said bottle being adapted to be tipped to cause liquid to flow from said body portion into said measuring well to trap a measured amount of liquid therein, said measuring well being so shaped that when the bottle is placed in a predetermined position all liquid within the measuring well in excess of the amount of liquid it is desired to measure therein will flow from the measuring well back into the body portion of the bottle, and that when said closure element is removed the trapped liquid will be discharged from the measuring well without additional tipping of the bottle, and means formed on the bottle for determining the tipped position of the bottle when liquid is trapped in the measuring well and said trapped liquid is discharged from said measuring well.

4. A bottle or the like having a body portion, a measuring well associated with said body portion and arranged in communication with the interior thereof, a closure element removably attached to said measuring well at the outer discharge end thereof, said bottle being adapted to be tipped to cause liquid to flow from said body portion into said measuring well to trap a measured amount of liquid therein, and said measuring well being so shaped that when the bottle is placed in a predetermined position all liquid within the measuring well in excess of the amount of liquid it is desired to measure therein will flow from the measuring well back into the body portion of the bottle, and that when said closure element is removed the trapped liquid will be discharged from the measuring well without additional tipping of the bottle, and means comprising an inclined face formed on said bottle for determining the tipped position of the bottle when liquid is trapped in the measuring well and said trapped liquid is discharged from said measuring well.

5. A bottle or the like having a body portion, a measuring well associated with said body portion and arranged in communication with the interior thereof, a closure element removably attached to said measuring well at the outer discharge end thereof, said bottle being adapted to be tipped to cause liquid to flow from said body portion into said measuring well to trap a measured amount of liquid therein, and said measuring well being so shaped that when the bottle is placed in a predetermined position all liquid within the measuring well in excess of the amount of liquid it is desired to measure therein will flow from the measuring well back into the body portion of the bottle, and that when said closure element is removed the trapped liquid will be discharged from the measuring well without additional tipping of the bottle, and means comprising inclined faces formed on said bottle for determining the tipped position of the bottle when liquid is trapped in the measuring well and said trapped liquid is discharged from said measuring well.

6. A bottle or the like having a body portion, a measuring well associated with said body portion and arranged in communication with the interior thereof, a closure element removably attached to said measuring well at the outer discharge end thereof, said bottle being adapted to be tipped to cause liquid to flow from the body portion into said measuring well to trap a measured amount of liquid therein, and said measuring well being of tapered shape so that when the bottle is placed in a predetermined position all liquid within the measuring well in excess of the amount of liquid it is desired to measure therein will flow from the measuring well back into the body portion of the bottle and so that when said closure element is removed the trapped liquid will be discharged from the measuring well without additional tipping of the bottle, and means formed on the bottle for determining the tipped position of the bottle when the proper amount of liquid is trapped in the measuring well and when said trapped liquid is discharged from the measuring well.

JOSEPH M. KENNEDY.